US012705477B2

(12) United States Patent
Agarwal et al.

(10) Patent No.: US 12,705,477 B2
(45) Date of Patent: Aug. 11, 2026

(54) LEARNING POLICIES USING SPARSE AND UNDERSPECIFIED REWARDS

(71) Applicant: Google LLC, Mountain View, CA (US)

(72) Inventors: Rishabh Agarwal, Montreal (CA); Chen Liang, Stanford, CA (US); Dale Eric Schuurmans, Mountain View, CA (US); Mohammad Norouzi, Richmond Hill (CA)

(73) Assignee: Google LLC, Mountain View, CA (US)

( * ) Notice: Subject to any disclaimer, the term of this patent is extended or adjusted under 35 U.S.C. 154(b) by 1282 days.

(21) Appl. No.: 17/180,682

(22) Filed: Feb. 19, 2021

(65) Prior Publication Data

US 2021/0256313 A1 Aug. 19, 2021

Related U.S. Application Data

(60) Provisional application No. 62/978,793, filed on Feb. 19, 2020.

(51) Int. Cl.
*G06N 3/08* (2023.01)
*G06F 18/21* (2023.01)
*G06F 18/214* (2023.01)
*G06N 3/092* (2023.01)

(52) U.S. Cl.
CPC ........... *G06N 3/08* (2013.01); *G06F 18/2148* (2023.01); *G06F 18/217* (2023.01); *G06N 3/092* (2023.01)

(58) Field of Classification Search
None
See application file for complete search history.

(56) References Cited

U.S. PATENT DOCUMENTS 11,074,480 B2 * 7/2021 Kim ..................... G05D 1/0088
11,429,854 B2 * 8/2022 El-Yaniv ................ G06N 3/045
11,449,556 B2 * 9/2022 Jawagal ................ G06F 40/284
11,477,243 B2 * 10/2022 Rao ........................ G06N 3/006
11,562,829 B2 * 1/2023 Wei ...................... A61B 5/7275
11,568,236 B2 * 1/2023 Yu .......................... G06N 3/006
11,580,445 B2 * 2/2023 Liu ........................ G06N 3/006
11,620,572 B2 * 4/2023 Trott ....................... G06F 18/22
706/12
11,651,208 B2 * 5/2023 Xu .......................... G06N 3/08
706/25

(Continued)

OTHER PUBLICATIONS

Li, Siyuan et al. Hierarchical Reinforcement Learning with Advantage-Based Auxiliary Rewards. 2019, Conference on Neural Information Processing Systems. <https://proceedings.neurips.cc/paper_files/paper/2019/file/81e74d678581a3bb7a720b019f4f1a93-Paper.pdf> (Year: 2019).*

(Continued)

*Primary Examiner* — Tamara T Kyle
*Assistant Examiner* — Tyler Schallhorn
(74) *Attorney, Agent, or Firm* — Fish & Richardson P.C.

(57) ABSTRACT

Methods and systems for learning policies using sparse and underspecified rewards. One of the methods includes training the policy jointly with an auxiliary reward function having a plurality of auxiliary reward parameters, the auxiliary reward function being configured to map, in accordance with the auxiliary reward parameters, trajectory features of at least a trajectory to an auxiliary reward value that indicates how well the trajectory performed a task in response to a context input.

20 Claims, 4 Drawing Sheets

400

Obtain training successful trajectories
402

Determine respective auxiliary rewards
404

Update current values of policy parameters
406

Obtain validation successful trajectories
408

Update current values of auxiliary reward parameters
410

(56) References Cited

U.S. PATENT DOCUMENTS

| | | | | |
|---|---|---|---|---|
| 12,293,283 | B2 * | 5/2025 | Zheng | G06N 3/0442 |
| 2018/0157973 | A1 * | 6/2018 | El-Yaniv | G06N 3/045 |
| 2019/0228309 | A1 * | 7/2019 | Yu | G05B 13/048 |
| 2020/0175364 | A1 * | 6/2020 | Xu | G06N 3/045 |
| 2020/0250486 | A1 * | 8/2020 | Kim | G01C 21/3484 |
| 2020/0285993 | A1 * | 9/2020 | Liu | G06N 20/00 |
| 2020/0304545 | A1 * | 9/2020 | Rao | G06F 18/2185 |
| 2020/0364614 | A1 * | 11/2020 | Trott | G06N 3/084 |
| 2021/0089910 | A1 * | 3/2021 | Zheng | G06N 3/08 |
| 2021/0174246 | A1 * | 6/2021 | Triplet | G06N 7/01 |
| 2021/0240776 | A1 * | 8/2021 | Jawagal | G06N 3/049 |
| 2022/0130546 | A1 * | 4/2022 | Wei | G06N 3/092 |
| 2022/0366245 | A1 * | 11/2022 | Guez | G06N 3/0464 |
| 2024/0046070 | A1 * | 2/2024 | Zaheer | G06N 3/08 |
| 2024/0086703 | A1 * | 3/2024 | Ritter | G06N 3/045 |

OTHER PUBLICATIONS

Huang, Shengyi et al. Action Guidance: Getting the Best of Sparse Rewards and Shaped Rewards for Real-time Strategy Games. Oct. 5, 2020, Cornell University. <https://doi.org/10.48550/arXiv.2010.03956> (Year: 2020).*

Zhu, Xiaohui et al. Meta-Reward Model Based on Trajectory Data with k-Nearest Neighbors Method. Sep. 28, 2020, IEEE. <https://doi.org/10.1109/IJCNN48605.2020.9207388> (Year: 2020).*

Memarian, Farzan et al. Self-Supervised Online Reward Shaping in Sparse-Reward Environments. Dec. 16, 2021, IEEE. <https://doi.org/10.1109/IROS51168.2021.9636020> (Year: 2021).*

Abadi et al., "Tensorflow: Large-scale machine learning on heterogeneous distributed systems," arXiv preprint arXiv:1603.04467, Mar. 2016, 19 pages.

Abbeel et al., "Apprenticeship learning via inverse reinforcement learning," Proceedings of the twenty-first international conference on Machine learning, Jul. 2004, 8 pages.

Abolafia et al., "Neural program synthesis with priority queue training," arXiv preprint arXiv:1801.03526, Jan. 2018, 16 pages.

Agarwal et al., "Learning to generalize from sparse and underspecified rewards," International Conference on Machine Learning, May 2019, 11 pages.

Amodei et al., "Concrete problems in AI safety," arXiv preprint arXiv:1606.06565, Jun. 2016, 29pages.

Antol et al., "Vqa: Visual question answering," Proceedings of the IEEE international conference on computer vision, 2015, 2425-2433.

Artzi et al., "Weakly supervised learning of semantic parsers for mapping instructions to actions," Transactions of the Association for Computational Linguistics, Mar. 2013, 1:49-62.

Bahdanau et al., "Learning to understand goal specifications by modelling reward," arXiv preprint arXiv:1806.01946, Jun. 2018, 19 pages.

Berant et al., "Explaining queries over web tables to non-experts," 2019 IEEE 35th International Conference on Data Engineering (ICDE), Apr. 2019, 1570-1573.

Berant et al., "Semantic parsing on freebase from question-answer pairs," Proceedings of the 2013 conference on empirical methods in natural language processing, Oct. 2013, 1533-1544.

Bosselut et al., "Discourse-aware neural rewards for coherent text generation," arXiv preprint arXiv:1805.03766, May 2018, 12 pages.

Chaplot et al., "Gated-attention architectures for task-oriented language grounding," Proceedings of the AAAI Conference on Artificial Intelligence, Apr. 2018, 32:1.

Chen et al., "Learning to interpret natural language navigation instructions from observations," Proceedings of the AAAI Conference on Artificial Intelligence, Aug. 2011, 25:1.

Chevalier-Boisvert et al., "Babyai: A platform to study the sample efficiency of grounded language learning," arXiv preprint arXiv:1810.08272, Oct. 2018, 19 pages.

Cho et al., "Adversarial tableqa: Attention supervision for question answering on tables," Asian Conference on Machine Learning, Nov. 2018, 391-406.

Christiano et al., "Deep reinforcement learning from human preferences," arXiv preprint arXiv:1706.03741, Jun. 2017, 17 pages.

Cobbe et al., "Quantifying generalization in reinforcement learning," International Conference on Machine Learning, May 2019, 1282-1289.

Dayan et al., "Using expectation-maximization for reinforcement learning," Neural Computation, Feb. 1997, 9(2):271-8.

Desautels et al., "Parallelizing exploration-exploitation tradeoffs in gaussian process bandit optimization," Journal of Machine Learning Research, 2014, 15:3873-923.

Duan et al., "R1 $/\ 2$: Fast reinforcement learning via slow reinforcement learning," arXiv preprint arXiv:1611.02779, Nov. 2016, 14 pages.

Finn et al., "Model-agnostic meta-learning for fast adaptation of deep networks," International Conference on Machine Learning, Jul. 2017, 1126-1135.

Fu et al., "From language to goals: Inverse reinforcement learning for vision-based instruction following," arXiv preprint arXiv:1902.07742, Feb. 2019, 14 pages.

Gleave et al., "Multi-task maximum entropy inverse reinforcement learning," arXiv preprint arXiv:1805.08882, May 2018, 9 pages.

Golovin et al., "Google vizier: A service for black-box optimization," Proceedings of the 23rd ACM SIGKDD International Conference on Knowledge Discovery and Data Mining, Aug. 2017, 10 pages.

Gupta et al., "Meta-reinforcement learning of structured exploration strategies," arXiv preprint arXiv:1802.07245, Feb. 2018, 11 pages.

Guu et al., "From language to programs: Bridging reinforcement learning and maximum marginal likelihood," arXiv preprint arXiv:1704.07926, Apr. 2017, 12 pages.

Haug et al., "Neural multi-step reasoning for question answering on semi-structured tables," European conference on information retrieval, Mar. 2018, 611-617.

Hermann et al., "Grounded language learning in a simulated 3d world," arXiv preprint arXiv:1706.06551, Jun. 2017, 22 pages.

Ho et al., "Generative adversarial imitation learning," arXiv preprint arXiv:1606.03476, Jun. 2016, 14 pages.

Huang et al., "Natural language to structured query generation via meta-learning," arXiv preprint arXiv:1803.02400, Mar. 2018, 9 pages.

Ibarz et al., "Reward learning from human preferences and demonstrations in atari," arXiv preprint arXiv:1811.06521, Nov. 2018, 20 pages.

Kingma et al., "Adam: A method for stochastic optimization," arXiv preprint arXiv:1412.6980, Dec. 2014, 15 pages.

Krishnamurthy et al., "Neural semantic parsing with type constraints for semi-structured tables," Proceedings of the 2017 Conference on Empirical Methods in Natural Language Processing, Sep. 2017, 1516-1526.

Langley et al., "Crafting papers on machine learning," 17th International Conference on Machine Learning, Jun. 2000, 6 pages.

Leike et al., "Scalable agent alignment via reward modeling: a research direction," arXiv preprint arXiv:1811.07871, Nov. 2018, 30 pages.

Liang et al., "Memory augmented policy optimization for program synthesis and semantic parsing," arXiv preprint arXiv:1807.02322, Jul. 2018, pages.

Liang et al., "Neural symbolic machines: Learning semantic parsers on freebase with weak supervision," ar Xiv preprint arXiv:1611.00020, Oct. 2016, 12 pages.

Liu et al., "Self-supervised generalisation with meta auxiliary learning," arXiv preprint arXiv:1901.08933, Jan. 2019, 13 pages.

Long et al., "Simpler context-dependent logical forms via model projections," arXiv preprint arXiv:1606.05378, Jun. 2016, 10 pages.

Maclaurin et al., "Gradient-based hyperparameter optimization through reversible learning," International conference on machine learning, Jun. 2015, 2113-2122.

Močkus et al., "On Bayesian methods for seeking the extremum," Optimization techniques IFIP technical conference, 1975, 400-404.

(56) References Cited

OTHER PUBLICATIONS

Mudrakarta et al., "It was the training data pruning too," arXiv preprint arXiv:1803.04579, Mar. 2018, 3 pages.
Nachum et al., "Improving policy gradient by exploring under-appreciated rewards," arXiv preprint arXiv:1611.09321, Nov. 2016, 17 pages.
Nagabandi et al., "Deep online learning via meta-learning: Continual adaptation for model-based rl," arXiv preprint arXiv:1812.07671, Dec. 2018, 15 pages.
Neelakantan et al., "Learning a natural language interface with neural programmer," arXiv preprint arXiv:1611.08945, Nov. 2016, 13 pages.
Nichol et al., "On first-order meta-learning algorithms," arXiv preprint arXiv:1803.02999, Mar. 2018, 15 pages.
Norouzi et al., "Reward augmented maximum likelihood for neural structured prediction," Advances In Neural Information Processing Systems, 2016, 29:1723-31.
Pasupat et al., "Compositional semantic parsing on semi-structured tables," arXiv preprint arXiv:1508.00305, Aug. 2015, 11 pages.
Pasupat et al., "Inferring logical forms from denotations," arXiv preprint arXiv:1606.06900, Jun. 2016, 10 pages.
Rasmussen et al., "Gaussian processes in machine learning," Advanced lectures on machine learning, 2004, 2 pages.
Ren et al., "Learning to reweight examples for robust deep learning," International Conference on Machine Learning, Jul. 2018, 4334-4343.
Shi et al., "Toward diverse text generation with inverse reinforcement learning," arXiv preprint arXiv:1804.11258, Apr. 2018, 8 pages.
Snoek et al., "Practical bayesian optimization of machine learning algorithms," arXiv preprint arXiv:1206.2944, Jun. 2012, 12 pages.
Wang et al., "Learning to reinforcement learn," arXiv preprint arXiv:1611.05763, Nov. 2016, 17 pages.
Wang et al., "No metrics are perfect: Adversarial reward learning for visual storytelling," arXiv preprint arXiv:1804.09160, Apr. 2018, 15 pages.
Williams et al., "Function optimization using connectionist reinforcement learning algorithms," Connection Science, Jan. 1991, 3(3):241-68.
Williams et al., "Simple statistical gradient-following algorithms for connectionist reinforcement learning," Machine learning, May 1992, 8(3-4):229-56.
Winograd et al., "Procedures as a representation for data in a computer program for understanding natural language," Massachusetts Inst of Tech Cambridge Project Mac, Feb. 1971, 472 pages.
Winograd et al., "Understanding natural language," Cognitive Psychology, Jan. 1972, 3(1):1-91.
Wu et al., "Learning to teach with dynamic loss functions," arXiv preprint arXiv:1810.12081, Oct. 2018, 15 pages.
Wu et al., "Sequence Prediction with Unlabeled Data by Reward Function Learning," IJCAI, Jan. 2017, 3098-3104.
Xie et al., "Few-shot goal inference for visuomotor learning and planning," Conference on Robot Learning, Oct. 2018, 40-52.
Xu et al., "Learning a prior over intent via meta-inverse reinforcement learning," International Conference on Machine Learning, May 2019, 6952-6962.
Xu et al., "Learning to explore via meta-policy gradient," International Conference on Machine Learning, Jul. 2018, 5463-5472.
Xu et al., "Meta-gradient reinforcement learning," arXiv preprint arXiv:1805.09801, May 2018, 17 pages.
Yih et al., "The value of semantic parse labeling for knowledge base question answering," Proceedings of the 54th Annual Meeting of the Association for Computational Linguistics, Aug. 2016, 201-206.
Zelle et al., "Learning to parse database queries using inductive logic programming," Proceedings of the national conference on artificial intelligence, Aug. 1996, 1050-1055.
Zhang et al., "A study on overfitting in deep reinforcement learning," arXiv preprint arXiv:1804.06893, Apr. 2018, 25 pages.
Zhang et al., "Macro grammars and holistic triggering for efficient semantic parsing," arXiv preprint arXiv:1707.07806, Jul. 2017, 14 pages.
Zhao et al., "Metric-optimized example weights," International Conference on Machine Learning, May 2019, 7533-7542.
Zheng et al., "On learning intrinsic rewards for policy gradient methods," arXiv preprint arXiv:1804.06459, Apr. 2018, 15 pages.
Zhong et al., "Seq2sql: Generating structured queries from natural language using reinforcement learning," arXiv preprint arXiv:1709.00103, Aug. 2017, 12 pages.
Ziebart et al., "Maximum entropy inverse reinforcement learning," Aaai, Jul. 2008, 8:1433-1438.
Zou et al., "Reward shaping via meta-learning," arXiv preprint arXiv:1901.09330, Jan. 2019, 12 pages.

* cited by examiner

LEARNING POLICIES USING SPARSE AND UNDERSPECIFIED REWARDS

CROSS-REFERENCE TO RELATED APPLICATION

This application claims priority to U.S. Provisional Application No. 62/978,793, filed on Feb. 19, 2020. The disclosure of the prior application is considered part of and is incorporated by reference in the disclosure of this application.

BACKGROUND

This specification relates to learning a policy for selecting a trajectory of actions in response to a context input.

Many systems represent policies for selecting actions using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system of one or more computers in one or more physical locations that learns a policy that selects a trajectory of actions in response to a context input. In particular, the system learns the policy such that the learned policy can effectively select trajectories of actions that result in a task being successfully completed when performed in response to received context inputs.

The subject matter described in this specification can be implemented in particular embodiments so as to realize one or more of the following advantages.

Episodic tasks that require generating a trajectory of actions conditioned on a context input to accomplish some goal frequently have task rewards that are sparse and underspecified. An example of a sparse and underspecified reward is a binary reward that is a first value, e.g., one, when the trajectory results in the task successfully being completed, and a second value, e.g., zero, for all other trajectories. These characteristics of the rewards make learning a policy, i.e., training a neural network, to successfully accomplish goals based solely on task rewards difficult. In particular, sparse rewards, i.e., rewards that are only non-zero for a very small subset of trajectories in the combinatorial space of possible trajectories, are problematic because they appear too infrequently to provide a good learning signal for the learning of the policy. Underspecified rewards, i.e., rewards that can be obtained even if the task was completed by exploiting spurious patterns in the environment, are problematic because learning to exploit spurious patterns inhibits generalization. Previous approaches have attempted to overcome these challenges by manually engineering an auxiliary reward function that augments the task reward signal. However, manually engineering auxiliary rewards is difficult and prevents the learned policy from effectively generalizing to new context inputs and new tasks. The described approaches, however, mitigate these challenges and effectively learn policies that exhibit high quality performance and excellent generalization to new context inputs and tasks after training. In particular, the described approaches learn an auxiliary reward function jointly with the policy, resulting in a policy that is both high performing and generalizable. Additionally, the described approaches collect an initial set of diverse successful trajectories, seeding the training with high quality and useful training data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
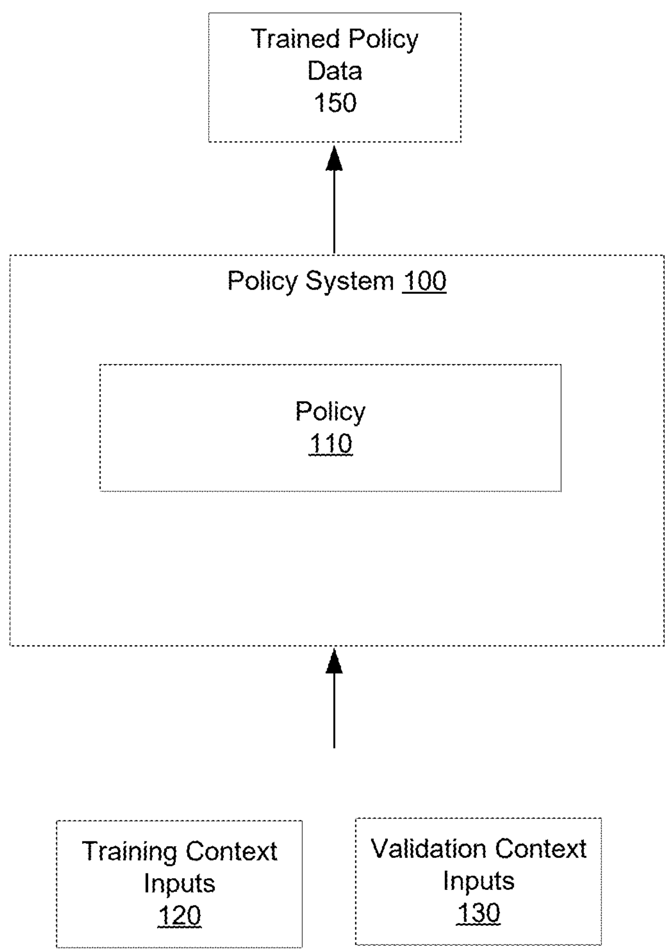
FIG. 1 shows an example policy system.

This specification describes a system of one or more computers in one or more physical locations that learns a policy that selects a trajectory of actions in response to a context input. In particular, the system learns the policy such that the learned policy can effectively select trajectories of actions that result in a task being successfully completed when performed in response to received context inputs.

Generally, in this specification "learning a policy" refers to training a machine learning model, e.g., a neural network, that is configured to map a context input to a trajectory of one or more actions.

For example, the machine learning model can be an auto-regressive neural network, e.g., a recurrent neural network, e.g., a long short-term memory (LSTM) neural network, or an attention-based neural network, e.g., a Transformer, that generates the first action in the trajectory conditioned on the context input and generates each subsequent action conditioned on the context input and on the earlier actions that have already been generated.

More specifically, the auto-regressive neural network can, at each of multiple generation time steps, generate an output defining a probability distribution over a set of possible actions conditioned on the context input and any actions already selected at previous generation time steps and select, e.g., sample or greedily select, an action from the probability distribution to add a new action to the trajectory. Thus, the output of the policy defines an auto-regressive probability distribution over possible trajectories. In some cases, the auto-regressive neural network can use beam search decoding to select the final trajectory of actions based on the probability distributions at the generation time steps.

Generally, each received context input specifies a context for how a task should be performed.

For example, the received context input can be an instruction for an agent, e.g., a robot, a vehicle, or other mechanical agent, that instructs an agent on how to successfully perform a task. As a particular example, the instruction can be natural language text that specifies a goal location in an environment that should be reached by the agent or an image of the goal location. As another particular example, the instruction can be natural language text that specifies a path through the environment that should be traversed by the agent in order to successfully complete task, e.g., by specifying a sequence of high level maneuvers that should be performed by the agent. As yet another example, the instruction can be natural language text identify an object or an image of an object with which the agent should perform a specified interaction.

In these examples, the actions in the trajectory of actions are control inputs for controlling the agent.

As another example, the task can be a program synthesis task, the context input can be natural language text specifying a desired goal of the synthesized computer program, and the actions can be the instructions in the synthesized computer program, e.g., written in a particular programming language. As a particular example, the context input can be a question that should be answered by the synthesized computer program when executed on a relevant data source.

As a particular example, the context input can be a natural language query or question and the trajectory of actions can be a sequence of structured query language (SQL) statements, i.e., an SQL program, that when executed on a relevant data table, produces the correct answer to the natural language query or question.

FIG. 1 shows an example policy system 100. The policy system 100 is an example of a system implemented as computer programs on one or more computers in one or more locations, in which the systems, components, and techniques described below can be implemented.

In particular, the system 100 trains (or "learns") a policy 110 that is used to control an agent to perform a task using a set of training context inputs 120 and a set of validation context inputs 130 and outputs trained policy data 150 that defines the trained policy 110.

The policy 110 has a plurality of policy parameters and is configured to receive a context input for performing a task and to generate, from the context input and in accordance with the policy parameters, a trajectory of one or more actions for performing the task.

As described above, the policy 110 can be implemented as a neural network or other machine learning model that maps a control input to a trajectory of one or more actions in accordance with a set of parameters (referred to in this specification as "policy parameters"). Thus, the system learns the policy 110 by repeatedly adjusting the values of the policy parameters to determine trained values of the policy parameters.

More specifically, the policy 110 maps the control input to an output that defines a probability distribution over possible trajectories. In some cases, the policy 110 directly maps the control input to the probability distribution, e.g., when the policy 110 is a feedforward neural network. In some other cases, the policy 110 is an auto-regressive model and the probability distribution is an auto-regressive distribution.

In response to generating a trajectory of actions conditioned on a given context input, e.g., using the policy 110, the system 100 receives a task reward value. The task reward value for a given trajectory indicates whether the task was successfully completed by performing the trajectory. For example, the system 100 or another system can perform the actions in the trajectory, e.g., in an environment, and generate a task reward value that reflects whether the task was successfully completed after the last action in the trajectory was performed. As a particular example, the task reward value can represent binary success-failure feedback, with the task reward value for a successful trajectory being one and the task reward value for an unsuccessful trajectory being zero.

Thus, the received task reward values tend to be sparse, i.e., only one task reward value is received per action trajectory and only a few successful trajectories in the space of possible trajectories for any given context input lead to a non-zero task reward. Additionally, task reward values can be underspecified, meaning that the task reward value does not distinguish between an action trajectory that was successful because it exploited a meaningful pattern in the environment and an action trajectory that was successful merely by chance, i.e., by exploiting some spurious pattern in the environment.

Thus, training the policy 110 to maximize task rewards directly can result in a trained policy that fails to generalize to context inputs outside of the training inputs 120 and therefore performs poorly on the task after training. Instead, the system 100 trains the policy 110 to optimize auxiliary rewards generated from trajectory features by an auxiliary reward function.

The operation of the system 100 during the training is described in more detail below with reference to FIG. 2.

After training, the system 100 can use the trained policy data 150 to select trajectories of actions in response to received context inputs, i.e., to perform the task, or provide the trained policy data 150 to another system for use in performing the task.

Figure 2:
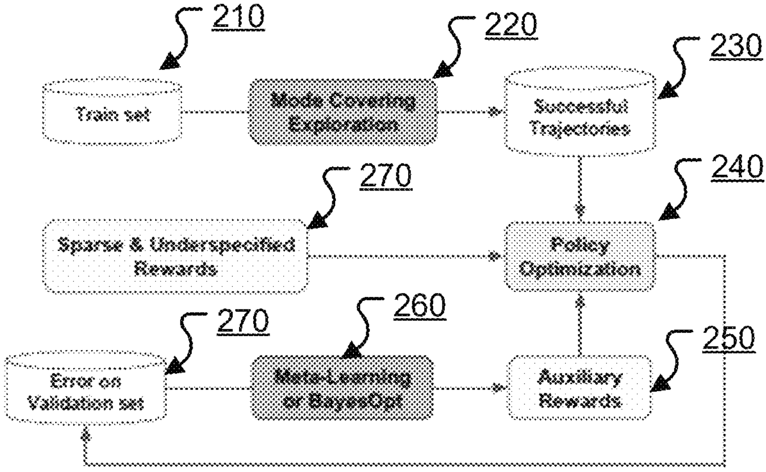
FIG. 2 shows the operation of the policy system while learning the policy

FIG. 2 shows the operation of the policy system 100 while learning the policy 110.

In particular, the system 100 obtains a train set 210 that includes a plurality of training context inputs and validation set 270 that includes a plurality of validation context inputs. For example, the system can receive separate train and validation sets or can receive a data set of context inputs and randomly partition the data set into the train set 210 and the validation set 270.

The system 100 then performs exploration, e.g., mode covering exploration 220, to generate successful trajectory data 230 that identifies a plurality of successful trajectories.

Each successful trajectory corresponds to a respective context input from the train set 210 or the validation set 270, i.e., either a training context input or a validation context input, and is a trajectory for which a received task reward value indicates that the task was successfully completed by performing the trajectory in response to the corresponding context input. That is, each successful trajectory reflects a successful completion of the task conditioned on the corresponding context input. For example, when the rewards are binary, the successful trajectories can be those for which a task reward value of one was received.

The system 100 can perform the exploration to identify successful trajectories in any of a variety of ways.

In one example, the system 100 performs random search, i.e., generates random trajectories, to identify trajectories that result in the task being successfully performed.

In another example, the system 100 trains, on the training set 120, the policy starting from initial values of the policy parameters to generate first values of the policy parameters using only task rewards, i.e., to optimize an objective that is based only on task rewards (and not auxiliary rewards as will be described later).

As a particular example, during this initial training, the system 100 can train, on the training set 120, the policy to optimize an Iterative Maximum Likelihood (IML) objective. The IML objective is an objective that promotes mode covering behavior when performing the task, i.e., that promotes learning a policy that assigns equal likelihoods to all possible successful trajectories.

Periodically, during this initial training, the system 100 uses the policy to identify successful trajectories. In other words, the system 100 can periodically use the current policy at the current point during the initial training to generate a plurality of trajectories, determine if any of the generated trajectories resulted in the task being successfully performed, and, if so, add the successful trajectories to the successful trajectory data 230.

Optionally, the system can use both the initial training and random search to generate the successful trajectory data 230, i.e., such that data 230 includes some trajectories generated using random search and some trajectories generated during the initial training of the policy.

Using the initial training on an objective that promotes mode covering behavior to generate successful trajectories (either in combination with random search or alone) can result in the successful trajectory data 230 being populated with successful trajectories that are more diverse than trajectories that would be generated using only random search or trajectories generated using an objective that promotes mode seeking behavior. This diversity of successful trajectories can improve the subsequent training of the policy using auxiliary rewards.

The system 100 then performs policy optimization 240.

During policy optimization 240, the system 100 trains the policy 110 jointly with an auxiliary reward function having a plurality of auxiliary reward parameters.

When the system performs the initial training described above, during the policy optimization 240, the system 100 can either train the policy 110 from scratch, i.e., from initial values of the parameters, or from the values of the parameters that were determined as a result of the initial training.

The auxiliary reward function is configured to map, in accordance with the auxiliary reward parameters, trajectory features of at least the trajectory and, optionally, also the context input to an auxiliary reward value 250 that indicates how well the trajectory performed the task in response to the context input.

As one example, the auxiliary reward function can be a linear function that computes the auxiliary reward value as a linear combination of the task features based on the auxiliary reward parameters.

As another example, the auxiliary reward function can be a neural network that receives the task features as input and processes the task features in accordance with the auxiliary reward parameters to generate the auxiliary task reward.

The trajectory features will generally be specific to the task being performed.

For example, when the received context input is an instruction for an agent that instructs an agent on how to successfully perform a task, the trajectory features can include single comparisons, pairwise comparisons, or both of counts of symbols and actions in the language command and the trajectory, respectively. For example, the features can include a tuple that, for a given symbol in the instruction and a given action in the trajectory, includes the number of times the given symbol occurred in the instruction and the number of times the given action occurred in the trajectory. As another example, the trajectory features can include features like the number of actions in the trajectory or the distance travelled by the agent by performing the trajectory.

When the task is a program synthesis task, the trajectory features can include any of: the length of the trajectory, features that represent a relationship between the entities in the natural language text and the entities in the computer program, features that represent how frequently entities of different types occur in the computer program, and so on.

To perform the policy optimization 240, i.e., to perform the joint training, the system 100 repeatedly performs the following operations.

The system 100 obtains, from the successful trajectory data 230, a plurality of training successful trajectories.

The system 100 determines, using the auxiliary reward function and in accordance with current values of the auxiliary reward parameters, a respective auxiliary reward 250 for each training successful trajectory.

The system 100 updates the current values of the policy parameters of the policy 110 using the auxiliary rewards 250 for the training successful trajectories and using the sparse and underspecified task rewards 270 for the training successful trajectories.

The system 100 also obtains, from the successful trajectory data 230, a plurality of validation successful trajectories.

The system then updates the current values of the auxiliary reward parameters based on the updated values of the policy parameters and using the validation successful trajectories, i.e., using the error on the validation set 270.

Performing the policy optimization 240 is described in more detail below with reference to FIGS. 3 and 4.

Figure 3:
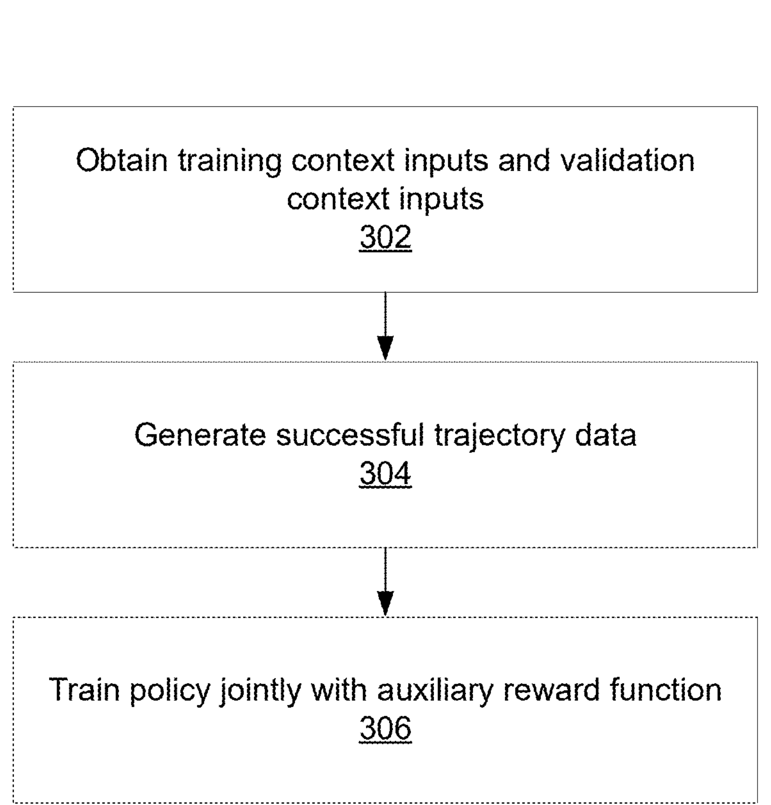
FIG. 3 is a flow diagram of an example process for learning a policy.

FIG. 3 is a flow chart of an example process 300 for learning a policy. For convenience, the process 300 will be described as being performed by a system of one or more computers located in one or more locations. For example, a policy system, e.g., the policy system 100 of FIG. 1, appropriately programmed in accordance with this specification, can perform the process 300.

The system obtains a plurality of training context inputs and a plurality of validation context inputs (step 302).

The system generates successful trajectory data that identifies a plurality of successful trajectories (step 304). In particular, the system generates the successful trajectory data as described above with reference to FIG. 2.

The system trains the policy jointly with an auxiliary reward function (step 306). In particular, the system trains the policy and the auxiliary reward function by repeatedly performing training iterations. At each training iteration, the system updates the policy and the auxiliary reward function, i.e., updates the current values of the policy parameters and the auxiliary reward parameters as of the training iteration. Performing a training iteration is described in more detail below with reference to FIG. 4.

Figure 4:
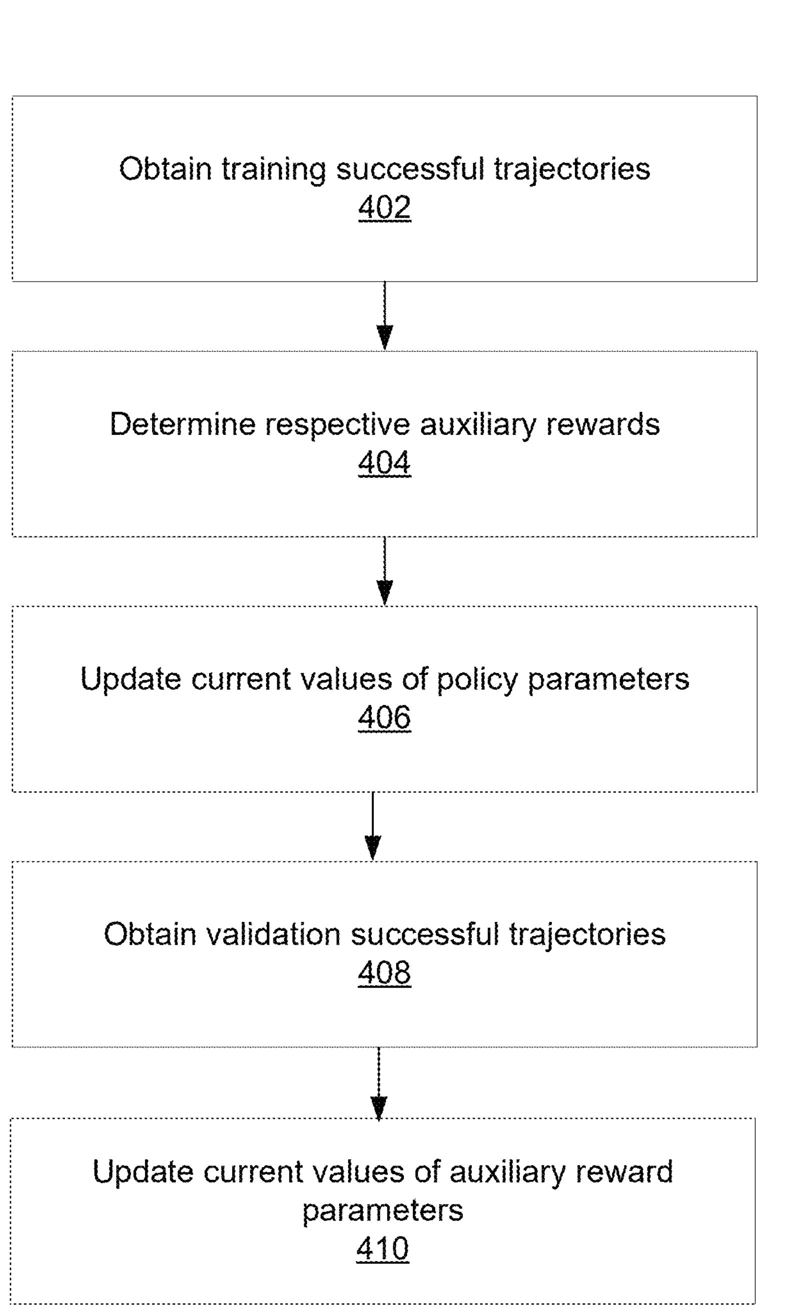
FIG. 4 is a flow diagram of an example process for updating the policy and the auxiliary reward function.

FIG. 4 is a flow chart of an example process 400 for updating the policy and the auxiliary reward function. For convenience, the process 400 will be described as being performed by a system of one or more computers located in one or more locations. For example, a policy system, e.g., the policy system 100 of FIG. 1, appropriately programmed in accordance with this specification, can perform the process 400.

The system can repeatedly perform the process 400 to jointly learn the policy and the auxiliary reward function. For example, the system can repeatedly perform the process 400 until some termination criterion is satisfied, e.g., until a threshold number of iterations have been performed, a threshold amount of time has elapsed, or the values of the policy parameters have converged.

The system obtains, from the successful trajectory data, a plurality of training successful trajectories, where, as descried above, each training successful trajectory is a successful trajectory that corresponds to a respective one of the training context inputs (step 402).

The system determines, using the auxiliary reward function and in accordance with current values of the auxiliary reward parameters, a respective auxiliary reward for each training successful trajectory (step 404).

That is, for each trajectory, the system applies the auxiliary reward function in accordance with the current values of the auxiliary reward parameters to trajectory features for the trajectory or both the context input and the trajectory to generate the respective auxiliary reward for the parameters.

In some cases, e.g., in cases where the task reward for a trajectory is one when the task is successful and zero when the task is not successful, the auxiliary reward for a successful trajectory is equal to the output of the auxiliary reward function. In some other cases, e.g., in cases where the task reward for a trajectory is not binary success-failure feedback, the auxiliary reward is equal to the output of the auxiliary reward function multiplied by the task reward for the trajectory.

The system updates the current values of the policy parameters using the auxiliary rewards for the training successful trajectories (step 406).

As a particular example, the system can update the current values of the policy parameters to optimize, e.g., maximize, a Memory Augmented Policy Optimization (MAPO) objective that is based on the auxiliary rewards.

The MAPO objective can be expressed as follows:

$$\sum_{x\in D_{train}}\left(\sum_{a\in B^{+}_{train}(x)}(R_{\phi}(a)\pi_{\theta}(a\mid x))\right)+\sum_{x\in D_{train}}\tau\mathcal{H}(\pi_{\theta}(\cdot\mid x)),$$

where x is a context input, $D_{train}$ is the set of training context inputs, a is a trajectory, $$B^{+}_{train}$$

is the set of successful training trajectories, $R_{\phi}(a)$ is the auxiliary reward function, $\phi$ are the auxiliary reward parameters, $\pi_{\theta}(a|x)$ is the policy, $\theta$ are the policy parameters, $\tau$ is a constant hyperparameter value, and H is the Shannon Entropy. The context inputs x in the first summation over x are the training context inputs that correspond to the plurality of sampled successful trajectories. The context inputs x in the second summation over x can either be the same training context inputs or a separate set of context inputs that are sampled independently from the set of training context inputs.

In particular, the system can compute a gradient with respect to the policy parameters of the MAPO objective and then use the gradient to update the current values of the policy parameters, e.g., by multiplying the gradient by a learning rate a and then subtracting the product from the current values, to determine updated values of the policy parameters.

The system obtains, from the successful trajectory data, a plurality of validation successful trajectories, where each validation successful trajectory is a successful trajectory that corresponds to a respective one of the validation context inputs (step 408).

The system updates the current values of the auxiliary reward parameters based on the updated values of the policy parameters and using the validation successful trajectories (step 410).

In particular, the system optimizes, e.g., maximizes, a validation objective that is based on task rewards for the validation successful trajectories, i.e., the auxiliary rewards are not optimized directly to maximize the rewards on the validation set but optimized such that a policy learned by maximizing the auxiliary rewards on the training set attains high underspecified task rewards on the validation set satisfies. As a particular example, the validation objective can satisfy, for a policy x:

$$\sum_{x\in D_{val}}\left(\sum_{a\in B^{+}_{val}(x)}(R(a)\pi_{\theta}(a\mid x))\right),$$

where $D_{val}$ is the set of validation context inputs, $$B^{+}_{val}$$

is the set of successful validaton trajectories, R(a) is the task reward for the trajectory a, and $\pi(a|x)$ is the policy.

In particular, the system computes the validation objective using the policy obtained after one gradient step update on the training objective, i.e., using the policy in accordance with the updated values of the policy parameters and therefore, the auxiliary rewards affect the validation objective via the updated values of the policy parameters. More specifically, the gradient of the above validation objective with respect to the auxiliary reward parameters can satisfy:

$$\nabla_{\theta}{'}O_{val}(\pi_{\theta}{'})\nabla_{\phi}\theta'(\phi),$$

where θ' are the updated values of the policy parameters and $O_{val}(\pi_{\theta}{'})$ is the validation objective evaluated at the policy defined by the updated policy parameter values.

Thus, the system trains the auxiliary reward function so that a policy trained using auxiliary rewards generated by the auxiliary reward function assigns high probabilities to successful trajectories.

Optionally, at some or all iterations of the process 400, the system can also generate additional successful trajectories and add the additional successful trajectories to the successful trajectory data.

In particular, the system obtains a training mini-batch of the training context inputs and a validation mini-batch of the validation context inputs, e.g., by sampling the mini-batches from the training context inputs and the validation context inputs, respectively.

For each context input in the training and validation mini-batches, the system generates a plurality of exploratory trajectories using the policy and in accordance with the current values of the policy parameters. That is, the system samples a plurality of exploratory trajectories from the probability distribution defined by the output generated by the policy for the corresponding context input.

The system obtains a respective task reward value for each of the exploratory trajectories that indicates whether the task was successfully completed by performing the exploratory trajectory and adds, to the successful trajectory data, any exploratory trajectories for which the task reward indicates that the task was successfully completed.

Thus, the system can repeatedly update the successful trajectory data with new successful trajectories as the policy improves during the training.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of learning a policy having a plurality of policy parameters configured to receive a context input for an agent to perform a task and to generate, from the context input and in accordance with the policy parameters, a trajectory of one or more actions for performing the task, wherein the one or more actions comprise control inputs for controlling the agent, the method comprising:

obtaining a plurality of training context inputs and a plurality of validation context inputs;

generating successful trajectory data that identifies a plurality of successful trajectories, each successful trajectory corresponding to a respective context input from either the training context inputs or the validation context inputs and being a trajectory for which a received task reward value indicates that the task was successfully completed by performing the trajectory in response to the corresponding context input; and training the policy jointly with an auxiliary reward function having a plurality of auxiliary reward parameters, the auxiliary reward function being configured to map, in accordance with the auxiliary reward parameters, trajectory features of at least a trajectory to an auxiliary reward value that indicates how well the trajectory performed the task in response to the context input, and the training comprising repeatedly performing at least the following operations:

obtaining, from the successful trajectory data, a plurality of training successful trajectories, wherein each training successful trajectory is a successful trajectory that corresponds to a respective one of the training context inputs;

determining, using the auxiliary reward function and in accordance with current values of the auxiliary reward parameters, a respective auxiliary reward for each training successful trajectory;

training the policy to update current values of the policy parameters using the auxiliary rewards for the training successful trajectories;

obtaining, from the successful trajectory data, a plurality of validation successful trajectories, wherein each validation successful trajectory is a successful trajectory that corresponds to a respective one of the validation context inputs; and training the auxiliary reward function on an objective that measures, for each validation successful trajectory, a probability assigned to the validation successful trajectory by outputs of the policy generated by processing the corresponding validation context input in accordance with the updated values of the policy parameters to update the current values of the auxiliary reward parameters, comprising computing gradients of the objective with respect to the auxiliary reward parameters using gradients of the objective with respect to the updated values of the policy parameters.

2. The method of claim 1, the following operations further comprising:

obtaining a training mini-batch of training context inputs and a validation mini-batch of validation context inputs;

for each context input in the training and validation mini-batches, generating a plurality of exploratory trajectories using the policy and in accordance with the current values of the policy parameters;

obtaining a respective task reward value for each of the exploratory trajectories that indicates whether the task was successfully completed by performing the exploratory trajectory; and adding, to the successful trajectory data, any exploratory trajectories for which the task reward indicates that the task was successfully completed.

3. The method of claim 1, wherein the auxiliary reward function is a linear function that computes the auxiliary reward value as a linear combination of the task features based on the auxiliary reward parameters.

4. The method of claim 1, wherein the auxiliary reward function is a neural network that receives the task features as input and processes the task features in accordance with the auxiliary reward parameters to generate the auxiliary task reward.

5. The method of claim 1, wherein generating successful trajectory data that identifies a plurality of successful trajectories comprises:

training the policy starting from initial values of the policy parameters to generate first values of the policy parameters using only task rewards; and periodically during the training using the policy to identify successful trajectories.

6. The method of claim 5, wherein training the policy starting from initial values of the policy parameters to generate first values of the policy parameters using only task rewards comprises training the policy to optimize an Iterative Maximum Likelihood (IML) objective.

7. The method of claim 5, wherein training the policy jointly with the auxiliary reward function comprises training the policy starting from the first values of the policy parameters.

8. The method of claim 1, wherein generating successful trajectory data that identifies a plurality of successful trajectories comprises:

identifying at least a subset of the trajectories in the successful trajectory data using random search.

9. The method of claim 1, wherein updating the current values of the policy parameters comprises updating the current values of the policy parameters to optimize a Memory Augmented Policy Optimization (MAPO) objective that is based on the auxiliary rewards.

10. The method of claim 1, wherein the objective measures, for each validation successful trajectory, a product of the received task reward value for the validation successful trajectory and a probability assigned to the validation successful trajectory by outputs of the policy generated by processing the corresponding validation context input in accordance with the updated values of the policy parameters to update the current values of the auxiliary reward parameters.

11. A system for learning a policy having a plurality of policy parameters and configured to receive a context input for an agent to perform a task and to generate, from the context input and in accordance with the policy parameters, a trajectory of one or more actions for performing the task, wherein the one or more actions comprise control inputs for controlling the agent, the system comprising one or more computers and one or more storage devices storing instructions that when executed by the one or more computers cause the one or more computers to perform operations comprising:

obtaining a plurality of training context inputs and a plurality of validation context inputs;

generating successful trajectory data that identifies a plurality of successful trajectories, each successful trajectory corresponding to a respective context input from either the training context inputs or the validation context inputs and being a trajectory for which a received task reward value indicates that the task was successfully completed by performing the trajectory in response to the corresponding context input; and training the policy jointly with an auxiliary reward function having a plurality of auxiliary reward parameters, the auxiliary reward function being configured to map, in accordance with the auxiliary reward parameters, trajectory features of at least a trajectory to an auxiliary reward value that indicates how well the trajectory performed the task in response to the context input, and the training comprising repeatedly performing at least the following operations:

obtaining, from the successful trajectory data, a plurality of training successful trajectories, wherein each training successful trajectory is a successful trajectory that corresponds to a respective one of the training context inputs;

determining, using the auxiliary reward function and in accordance with current values of the auxiliary reward parameters, a respective auxiliary reward for each training successful trajectory;

training the policy to update current values of the policy parameters using the auxiliary rewards for the training successful trajectories;

obtaining, from the successful trajectory data, a plurality of validation successful trajectories, wherein each validation successful trajectory is a successful trajectory that corresponds to a respective one of the validation context inputs; and training the auxiliary reward function on an objective that measures, for each validation successful trajectory, a probability assigned to the validation successful trajectory by outputs of the policy generated by processing the corresponding validation context input in accordance with the updated values of the policy parameters to update the current values of the auxiliary reward parameters, comprising computing gradients of the objective with respect to the auxiliary reward parameters using gradients of the objective with respect to the updated values of the policy parameters.

12. The system of claim 11, the following operations further comprising:

obtaining a training mini-batch of training context inputs and a validation mini-batch of validation context inputs;

for each context input in the training and validation mini-batches, generating a plurality of exploratory trajectories using the policy and in accordance with the current values of the policy parameters;

obtaining a respective task reward value for each of the exploratory trajectories that indicates whether the task was successfully completed by performing the exploratory trajectory; and adding, to the successful trajectory data, any exploratory trajectories for which the task reward indicates that the task was successfully completed.

13. The system of claim 11, wherein the auxiliary reward function is a linear function that computes the auxiliary reward value as a linear combination of the task features based on the auxiliary reward parameters.

14. The system of claim 11, wherein the auxiliary reward function is a neural network that receives the task features as input and processes the task features in accordance with the auxiliary reward parameters to generate the auxiliary task reward.

15. The system of claim 11, wherein generating successful trajectory data that identifies a plurality of successful trajectories comprises:

training the policy starting from initial values of the policy parameters to generate first values of the policy parameters using only task rewards; and periodically during the training using the policy to identify successful trajectories.

16. The system of claim 15, wherein training the policy starting from initial values of the policy parameters to generate first values of the policy parameters using only task rewards comprises training the policy to optimize an Iterative Maximum Likelihood (IML) objective.

17. The system of claim 15, wherein training the policy jointly with the auxiliary reward function comprises training the policy starting from the first values of the policy parameters.

18. The system of claim 11, wherein generating successful trajectory data that identifies a plurality of successful trajectories comprises:

identifying at least a subset of the trajectories in the successful trajectory data using random search.

19. The system of claim 11, wherein updating the current values of the policy parameters comprises updating the current values of the policy parameters to optimize a Memory Augmented Policy Optimization (MAPO) objective that is based on the auxiliary rewards.

20. One or more non-transitory computer-readable storage media storing instructions that when executed by one or more computers cause the one or more computers to perform operations for learning a policy having a plurality of policy parameters and configured to receive a context input for an agent to perform a task and to generate, from the context input and in accordance with the policy parameters, a trajectory of one or more actions for performing the task, wherein the one or more actions comprise control inputs for controlling the agent, the operations comprising:

obtaining a plurality of training context inputs and a plurality of validation context inputs;

generating successful trajectory data that identifies a plurality of successful trajectories, each successful trajectory corresponding to a respective context input from either the training context inputs or the validation context inputs and being a trajectory for which a received task reward value indicates that the task was successfully completed by performing the trajectory in response to the corresponding context input; and training the policy jointly with an auxiliary reward function having a plurality of auxiliary reward parameters, the auxiliary reward function being configured to map, in accordance with the auxiliary reward parameters, trajectory features of at least a trajectory to an auxiliary reward value that indicates how well the trajectory performed the task in response to the context input, and the training comprising repeatedly performing at least the following operations:

obtaining, from the successful trajectory data, a plurality of training successful trajectories, wherein each training successful trajectory is a successful trajectory that corresponds to a respective one of the training context inputs;

determining, using the auxiliary reward function and in accordance with current values of the auxiliary reward parameters, a respective auxiliary reward for each training successful trajectory;

training the policy to update current values of the policy parameters using the auxiliary rewards for the training successful trajectories;

obtaining, from the successful trajectory data, a plurality of validation successful trajectories, wherein each validation successful trajectory is a successful trajectory that corresponds to a respective one of the validation context inputs; and training the auxiliary reward function on an objective that measures, for each validation successful trajectory, a probability assigned to the validation successful trajectory by outputs of the policy generated by processing the corresponding validation context input in accordance with the updated values of the policy parameters to update the current values of the auxiliary reward parameters, comprising computing gradients of the objective with respect to the auxiliary reward parameters using gradients of the objective with respect to the updated values of the policy parameters.

* * * * *